US012773373B2

(12) United States Patent
Kaintz et al.

(10) Patent No.: US 12,773,373 B2
(45) Date of Patent: Oct. 27, 2026

(54) CABINET WITH INTEGRATED PICK-AND-PLACE MECHANISM

(71) Applicant: Omnicell, Inc., Mountain View, CA (US)

(72) Inventors: Ryan Kaintz, Allison Park, PA (US); Ezekiel Braun, Sewickley, PA (US)

(73) Assignee: Omnicell, Inc., Cranberry Township, PA (US)

( * ) Notice: Subject to any disclaimer, the term of this patent is extended or adjusted under 35 U.S.C. 154(b) by 260 days.

(21) Appl. No.: 18/317,159

(22) Filed: May 15, 2023

(65) Prior Publication Data

US 2023/0285246 A1 Sep. 14, 2023

Related U.S. Application Data

(63) Continuation of application No. 17/005,803, filed on Aug. 28, 2020, now Pat. No. 11,684,549.

(51) Int. Cl.
*B25J 9/16* (2006.01)
*A47B 67/02* (2006.01)
(Continued)

(52) U.S. Cl.
CPC ............. *A61J 7/0076* (2013.01); *A47B 67/02* (2013.01); *B25J 9/1692* (2013.01); *B25J 13/08* (2013.01);
(Continued)

(58) Field of Classification Search
CPC ...... B25J 9/1669; B25J 9/1697; B25J 11/009; B25J 9/1692; B25J 13/08; B25J 13/086;
(Continued)

(56) References Cited

U.S. PATENT DOCUMENTS

| | | | | |
|---|---|---|---|---|
| 5,083,073 A * | 1/1992 | Kato | ...................... | B25J 9/1697 700/254 |
| 5,321,353 A * | 6/1994 | Furness | .................. | B25J 9/1697 901/47 |

(Continued)

FOREIGN PATENT DOCUMENTS

| | | |
|---|---|---|
| JP | 2011173200 A | 9/2011 |
| JP | 2013529556 A | 7/2013 |

OTHER PUBLICATIONS

U.S. Appl. No. 17/005,803, Non-Final Office Action, mailed Oct. 7, 2022, 26 pages. U.S. Patent & Trademark Office, Alexandria, Virginia US.

(Continued)

*Primary Examiner* — Adam R Mott
*Assistant Examiner* — Matthew C Gammon
(74) *Attorney, Agent, or Firm* — Lee & Hayes, P.C.

(57) ABSTRACT

A method of performing location teaching of a robotic arm includes maneuvering an end of arm tooling of a robotic arm to a predefined position of an interface object. The robotic arm is mounted within a mounting site of a mechanical mounting structure. The interface object is positioned on a sub-system of a medication dosing system that is mounted on the mechanical mounting structure. The interface object includes an alignment feature of a known size and shape. A sensor of the end of arm tooling is engaged with the interface object. An offset between the sensor and the interface object is determined based on an interaction between the sensor and the alignment feature. A position of the end of arm tooling is incremented with respect to the interface object along at least one axis. An actual position of the interface object is determined relative to the robotic arm.

15 Claims, 9 Drawing Sheets

(51) Int. Cl.
*A61J 7/00* (2006.01)
*B25J 13/08* (2006.01)
*B25J 15/00* (2006.01)
*B25J 19/02* (2006.01)

(52) U.S. Cl.
CPC ............. *B25J 13/086* (2013.01); *B25J 15/00* (2013.01); *B25J 19/022* (2013.01)

(58) Field of Classification Search
CPC ........ B25J 15/00; B25J 19/022; B25J 9/1656; A61J 1/20; A61J 7/0076; A61J 3/002; A61J 1/065; A61J 1/10; A61J 1/22; B65B 3/003; B65B 31/02; G07F 9/002; G07F 11/165; G07F 11/70; A47B 67/02; G05B 2219/49114; G05B 2219/36412
See application file for complete search history.

(56) References Cited

U.S. PATENT DOCUMENTS 11,684,549 B2 * 6/2023 Kaintz ................... A47B 67/02 700/258
2010/0241270 A1 * 9/2010 Eliuk ........................ A61J 1/20 700/216
2013/0096718 A1 * 4/2013 Friedman ............. G05B 19/401 700/254
2013/0183148 A1 * 7/2013 Stoicescu .............. F04D 29/445 415/203
2014/0005829 A1 1/2014 Chhatpar et al.
2014/0100694 A1 4/2014 Rueckl et al.

OTHER PUBLICATIONS

U.S. Appl. No. 17/005,803, Notice of Allowance, mailed Feb. 15, 2023, 8 pages. U.S. Patent & Trademark Office, Alexandria, Virginia US.
Australian Patent Application No. AU2021332078, “First Examination Report”, mailed Dec. 22, 2023, 3 pages. IP Australia, Woden, Australia.
Australian Patent Application No. AU2021332078, “Notice of Acceptance”, Dec. 16, 2024, 3 pages. IP Australia, Woden, Australia.
Australian Patent Application No. AU2021332078, “Second Examination Report”, Oct. 15, 2024, 3 pages. IP Australia, Woden, Australia.
Canada Patent Application No. CA3191026, Office Action, mailed Sep. 4, 2024, 5 pages. Canadian Intellectual Property Office, Gatineau, Quebec, Canada.
European Patent Application No. EP21862386.6, Extended European Search Report, mailed Sep. 10, 2024, 13 pages. European Patent Office, Munich, Germany.
Japan Application No. JP2023-513592, Office Action, mailed Jul. 2, 2024, 5 pages. Japan Patent Office, Tokyo, Japan.
International Patent Application No. PCT/US2021/046226, International Preliminary Report on Patentability mailed Mar. 9, 2023, 11 pages. International Bureau of WIPO, Geneva, Switzerland.

* cited by examiner

CABINET WITH INTEGRATED PICK-AND-PLACE MECHANISM

CROSS REFERENCES TO RELATED APPLICATIONS

This application is a continuation of U.S. patent application Ser. No. 17/005,803, filed Aug. 28, 2020, which is related to U.S. patent application Ser. No. 17/005,786, filed Aug. 28, 2020, U.S. patent application Ser. No. 17/005,637, filed Aug. 28, 2020, U.S. patent application Ser. No. 17/005,650, filed Aug. 28, 2020, and U.S. patent application Ser. No. 17/006,027, filed Aug. 28, 2020, the disclosures of which are hereby incorporated by reference herein in their entireties for all purposes.

BACKGROUND OF THE INVENTION

Accurate and repeatable interaction between robotic arms and various sub-systems of pick-and-place systems for placement of medical consumables. In conventional pick-and-place systems, teaching the interaction points between the robotic arms and sub-systems can become very time consuming, as it may be necessary to perform a manual teaching process on each unit to account for possible manufacturing variations.

BRIEF SUMMARY OF THE INVENTION

Embodiments of the present invention are directed to mechanical mounting structures that have precise dimensions. These structures house robotic arms and sub-systems related to managing and/or dispensing doses of medication. Embodiments enable a robotic arm mounted to the mounting structure to quickly and automatically learn and update locations of interaction points of sub-systems that are mounted to the mounting structure. Embodiments may teach the locations of the interaction points to the robotic arm using sensors that detect the location of interface objects that are affixed to the interaction points.

In one embodiment, a method of performing location teaching of a robotic arm is provided. The method may include maneuvering an end of arm tooling of a robotic arm to a predefined position of an interface object. The interface object may be positioned on a sub-system of a medication dosing system. The interface object may include at least one alignment feature of a known size and shape. The method may include engaging a sensor of the end of arm tooling with the interface object and determining that the sensor of the end of arm tooling is offset from the interface object based at least in part on an interaction between the sensor and the at least one alignment feature. The method may further include incrementing a position of the end of arm tooling with respect to the interface object along at least one axis and determining an actual position of the interface object.

In some embodiments, the method may also include programming the robotic arm with three-dimensional coordinates that define the actual position of the interface object to teach the robotic arm a precise position of the sub-system. The method may include affixing the interface object to the sub-system and programming the robotic arm with the predefined position of the interface object. The sensor may include one or both of an optical sensor that is configured to optically determine the actual position of the interface object and a sensor that senses a gripping close position of a gripper affixed to the end of arm tooling. The optical sensor may include one or both of an imaging device and a laser. The method may include determining a distance and axial direction of the offset. The position of the end of arm tooling may be incremented based on the distance and axial direction of the offset. In some embodiments, determining the actual position of the interface object may include detecting perfect alignment between interface object and the sensor and recording 3-dimensional coordinates associated with a current position of the interface object.

In another embodiment, a medication dosing system may be provided. The system may include a mechanical mounting structure that includes a base plate and a sidewall that extends vertically relative to the base plate. The base plate may define a mounting site. The mechanical mounting structure may have known dimensions to within 0.010 inches. The system may include at least one sub-system coupled with the sidewall and an interface object affixed to the at least one sub-system. The interface object may include at least one alignment feature of a known size and shape. The system may also include a robotic arm coupled with the mounting site. The robotic arm may include an end of arm tooling with a sensor. The system may include a processor and a memory. The memory may have instructions stored thereon that, when executed by the processor, cause the medication dosing system to maneuver the end of arm tooling of a robotic arm to a predefined position of the interface object and engage the sensor of the end of arm tooling with the interface object. The instructions may further cause the medication dosing system to determine that the sensor of the end of arm tooling is offset from the interface object based at least in part on an interaction between the sensor and the at least one alignment feature, increment a position of the end of arm tooling with respect to the interface object along at least one axis, and determine an actual position of the interface object.

In some embodiments, the interface object may be positioned proximate an interaction point of the sub-system with which the robotic arm is configured to interact during operation of the medication dosing system. The system may further include a gripping element affixed to the end of arm tooling. The sensor may be configured to determine a gripping position of the gripping element to determine an alignment of the sensor and the interface object. The actual position of the interface object may be defined in a 3-dimensional coordinate system. The at least one sub-system may include a dosing station, a syringe preparation and inspection station, a vial management station, a reconstitution/stock solution processing station, a bag management station, a container loading and unloading station, and/or a syringe finishing station. The sensor may include one or both of an optical sensor that may be configured to optically determine the actual position of the interface object and a sensor that may sense a gripping position of a gripper affixed to the end of arm tooling. The end of arm tooling may include a gripping element. Engaging the sensor of the end of arm tooling with the interface object may include closing the gripping element about the interface object, recording a gripping position of the gripping element, and determining one or both of a distance and axial direction of the offset based on the gripping position of the gripping element.

In another embodiment, a medication dosing system may include a mechanical mounting structure that includes a base plate and a sidewall that extends vertically relative to the base plate. The base plate may define a mounting site. The mechanical mounting structure may have known dimensions to within 0.010 inches. The system may include at least one sub-system coupled with the sidewall and an interface object affixed to the at least one sub-system. The interface object may include at least one alignment feature of a known size and shape. The system may further include a robotic arm coupled with the mounting site. The robotic arm may include an end of arm tooling with a sensor that is configured to determine an actual location of the interface object, and the robotic arm is translatable in three dimensions to move the sensor relative to the interface object.

In some embodiments, the sensor may include an optical sensor. The at least one alignment feature may include a computer-readable pattern that enables the optical sensor to align the end of arm tooling with the interface object. The optical sensor may be configured to determine a horizontal distance between the end of arm tooling and the interface object. The sidewall may be a first sidewall, the sub-system may be a first sub-system, and the mechanical mounting structure may further include a second sidewall and a second sub-system. The robotic arm may be further configured to transfer objects between the first sub-system and the second sub-system. The end of arm tooling may include a gripping element. The interface object may include one or both of a variable diameter and a variable cross-sectional shape that allow the sensor to determine an alignment of the sensor and the interface object based on a degree of closure of the gripping element about the interface object. The interface object may include a generally conical profile. The at least one sub-system may include a dosing station, a syringe preparation and inspection station, a vial management station, a reconstitution/stock solution processing station, a bag management station, a container loading and unloading station, and/or a syringe finishing station.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label. Additionally, where similar components include the same first reference label, the similar components may have similar structure and operation except where explicitly stated otherwise.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It will be understood that various changes may be made in the function and arrangement of elements without departing from the spirit and scope of the invention as set forth in the appended claims. Merely by way of example, any embodiment described herein may or may not have any of the features discussed therewith, and may or may not have any feature discussed with respect to other embodiments.

Embodiments of the present invention provide mechanical mounting structures for medication dosing equipment. The mechanical mounting structures are produced and assembled to strict tolerances, which provides a controlled environment that enables programming interaction locations of a robotic arm to be performed quickly and automatically by the robotic arm. For example, such mounting structures enable a quick quality control check of the positions of various sub-systems stationed about the robotic arm. The structure provides this ability by interfacing the end of arm tooling of the robotic arm with interface objects that are attached to the structure at various known points. The robotic arm, through vision and/or physical interaction, may interface with these points and determine exactly where the sub-systems are mounted in the 3-dimensional space of the structure.

Figure 1B:
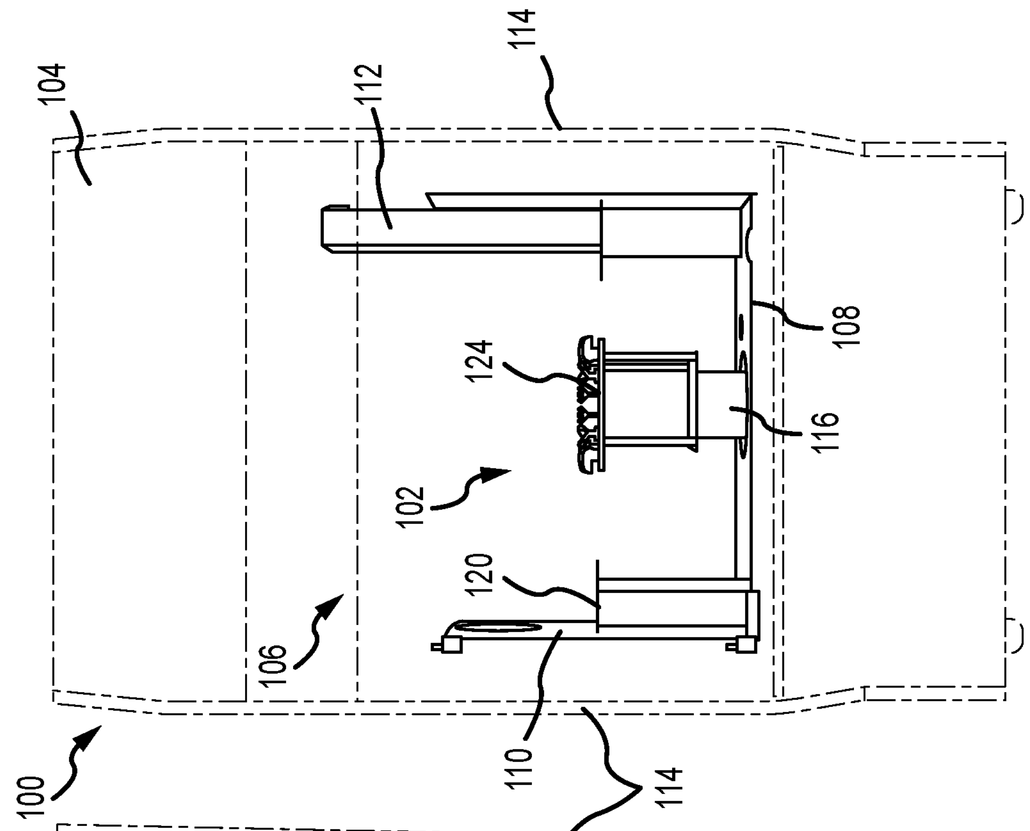
FIG. 1B illustrates an isometric view of the cabinet of FIG. 1A.
Figure 1A:
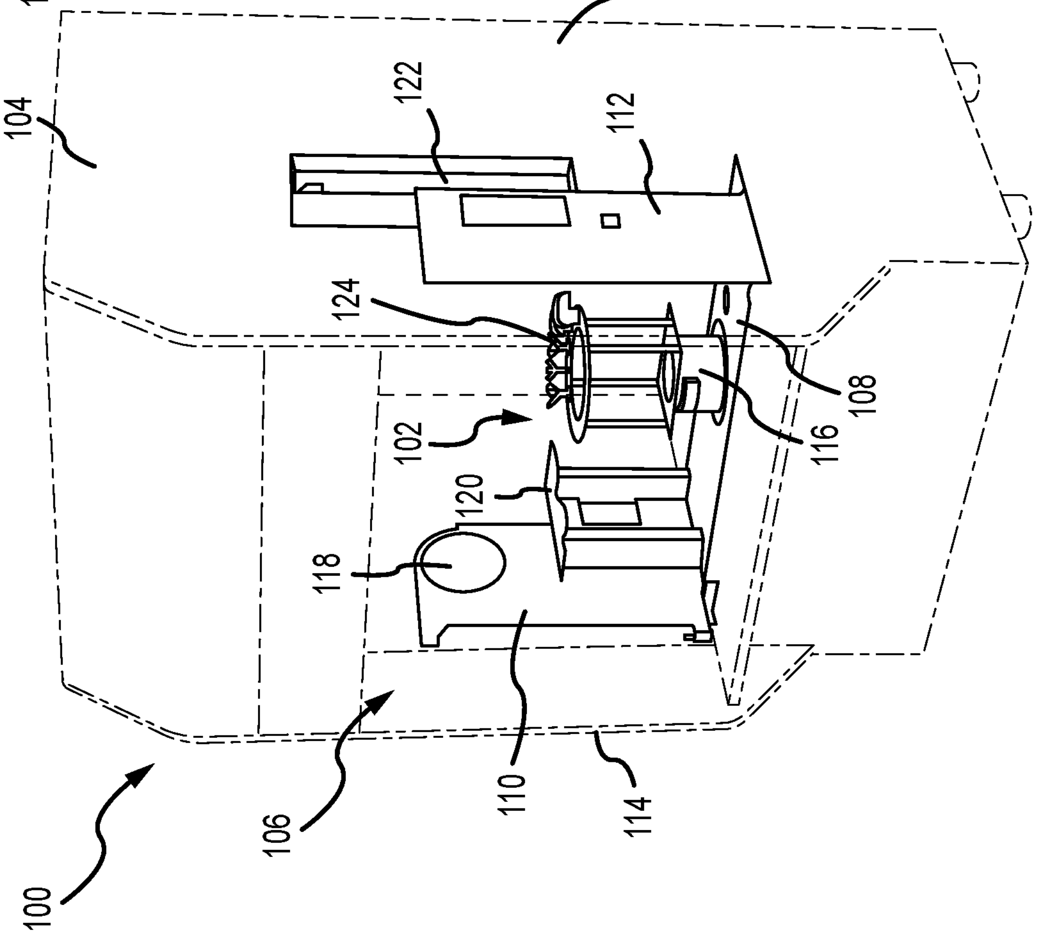
FIG. 1A illustrates a front view of a cabinet that includes a mechanical mounting structure according to embodiments of the present invention.

Turning to FIGS. 1A and 1B, an embodiment of a cabinet 100 is illustrated that has a mechanical mounting structure 102 mounted therein. The cabinet 100 may include a housing 104 in which some or all components of a medication dosing system are mounted. As illustrated, the housing 104 defines an inner bay 106 that provides space for the mechanical mounting structure 102 and any medication dosing equipment mounted therein. In some embodiments, the mechanical mounting structure 102 may form a portion of a chassis of the cabinet 100. The mechanical mounting structure 102 may include a baseplate 108, a first sidewall 110, and a second sidewall 112. Each of the first sidewall 110 and the second sidewall may be coupled and/or formed integrally with opposing ends of the baseplate 108 such that the first sidewall 110 and the second sidewall 112 face one another. As illustrated, the first sidewall 110 and second sidewall 112 are arranged along lateral sides 114 of the housing 104, leaving a front and rear of the inner bay 106 exposed. However it will be appreciated that other arrangements of sidewalls may be used in various embodiments. For example, some embodiments, may include a front and/or rear sidewall. Additionally, while shown here with two sidewalls, any number of sidewalls may be utilized, including a single sidewall.

The baseplate 108, the first sidewall 110, and/or the second sidewall 112 may be formed integrally from a single piece of material, such as a machinable metal alloy, and/or may be formed separately and later joined. For example, each of the baseplate 108, the first sidewall 110, and the second sidewall 112 may be formed with one or more mating apertures (not shown) that are configured to receive pins, bolts, rivets, and/or other fasteners. Each of the baseplate 108, the first sidewall 110, and the second sidewall 112 may be precision machined, such as by using a computer numerical control (CNC) machine, and/or other manufacturing techniques. Each feature (including the mating apertures) of the baseplate 108, the first sidewall 110, and/or the second sidewall 112 may be formed within 0.010 inches, more commonly within 0.005 inches of the dimensions set forth in the design specifications. By ensuring that the baseplate 108, the first sidewall 110, and the second sidewall 112 (as well as the mating apertures), are formed within such tight manufacturing tolerances, it can be assured that once assembled (such as by aligning the mating apertures of the baseplate and sidewalls 110, 112 and inserting fasteners within the mating apertures) the mechanical mounting structure 102 will have very precise and uniform dimensions, which enables a highly accurate 3-dimensional coordinate system to be established with respect to the mechanical mounting structure 102. This is critical for providing self-teaching robotic arms as disclosed in greater detail below.

The baseplate 108 may define a mounting site 116 that may be used to secure a robotic arm (not shown) to the mechanical mounting structure 102. For example, the mounting site 116 may define a generally cylindrical recess 124 having an open top. The recess 124 may receive a base and electronic components of a robotic arm, while an end of arm tooling of the robotic arm extends from the open top so as to be able to interact with one or more sub-systems (not shown) that are mounted on the sidewalls 110, 112. A bottom of the mounting site 116 may have an opening (not shown) that enables power and/or control cabling to be routed from the robotic arm to a power source of the cabinet 100.

In some embodiments, each of the first sidewall 110 and the second sidewall 112 may have a generic structure, such as a generally flat profile that includes one or more mounting locations for various sub-systems. In other embodiments, one or both of the first sidewall 110 and the second sidewall 112 may have a unique structure that may be designed to secure a specific sub-system within the cabinet 100. The unique structure may be custom designed to mount and/or receive various components of the specified sub-system. For example, as illustrated here, the first sidewall 110 defines a large circular cutout 118 that is able to receive a rotational actuator of a medication dosing sub-system (not shown). The first sidewall also includes a platform 120 that may serve as a shelf and/or a medication bag mounting site of the medication dosing sub-system. The second sidewall 112 may have a same or different design. For example, as illustrated here, the second sidewall 112 is a taller structure than the first sidewall 110 and defines an elongate rectangular opening 122 for receiving components of a syringe finishing sub-system. It will be appreciated that any design of the sidewalls 110, 112 may be provided, with each design being precision machined to enable the establishment of a highly accurate 3-dimensional coordinate system with respect to the mechanical mounting structure 102. This is critical to providing efficient automatic location learning capabilities to a robotic arm.

It will be appreciated that while illustrated with the mechanical mounting structure 102 mounted within cabinet 100, in various embodiments the mechanical mounting structure 102 may be mounted within other structures and/or may be provided as a standalone structure for supporting medication dosing sub-systems. Additionally, while largely described in the context of medication dosing systems, it will be appreciated that embodiments of the mechanical mounting structure 102 and learning techniques described herein may be applied to other robotic arm and/or pick-and-place systems.

Figure 2A:
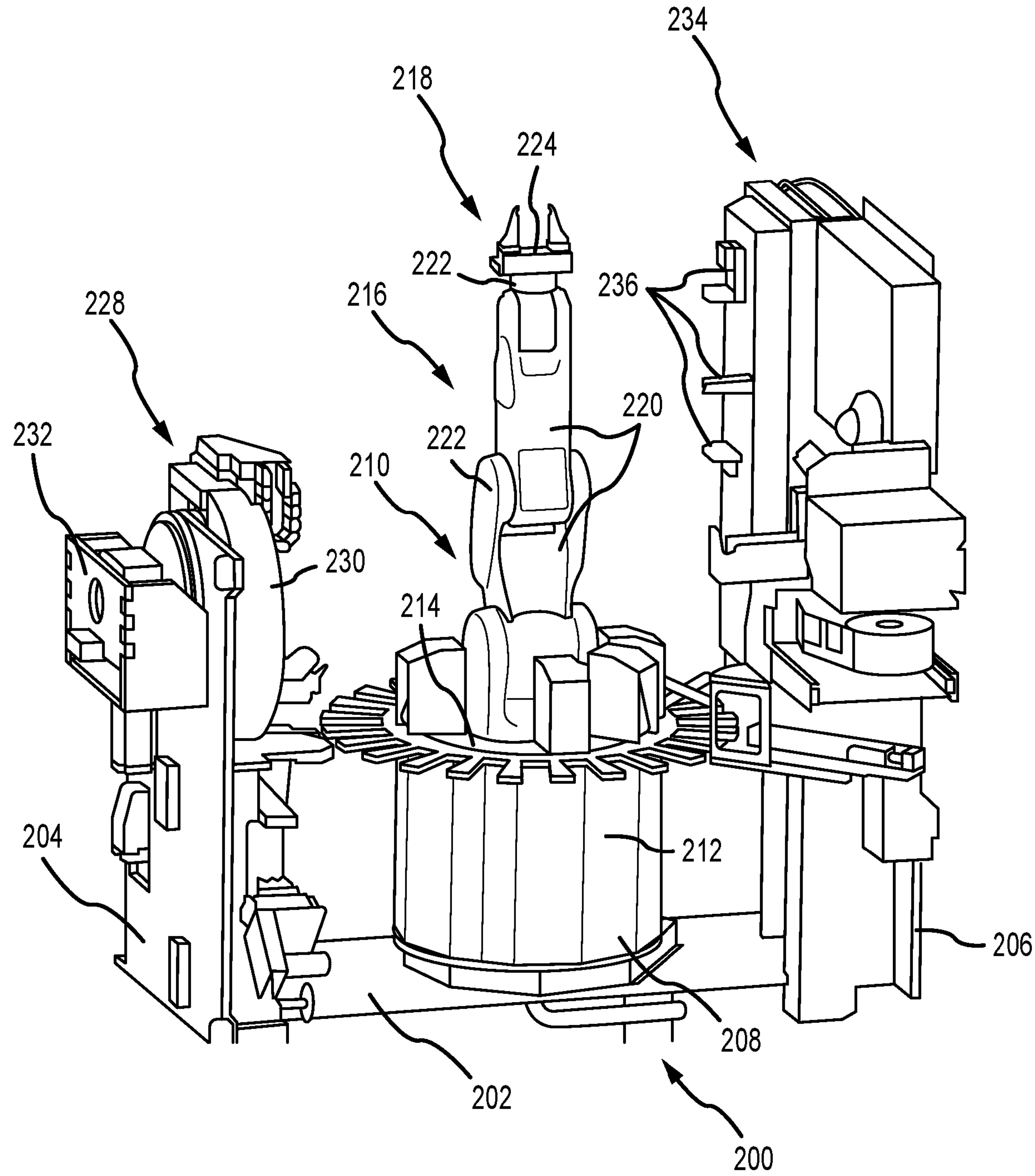
FIG. 2A illustrates a mechanical mounting structure and robotic arm according to embodiments of the present invention.
Figure 2B:
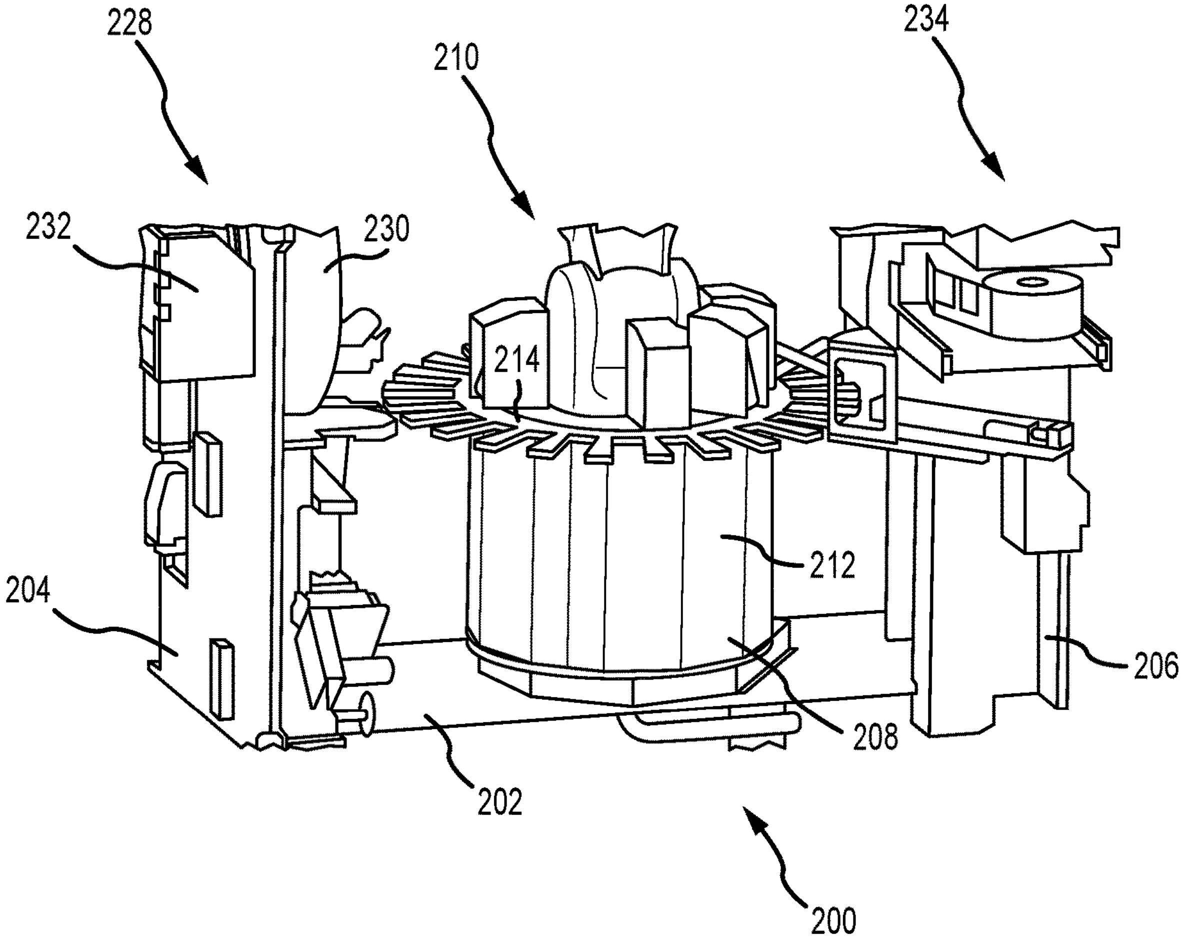
FIG. 2B illustrates a lower portion of the mechanical mounting structure and robotic arm of FIG. 2A.

FIGS. 2A and 2B illustrate a mechanical mounting structure 200 according to an embodiment of the present invention. The mechanical mounting structure 200 may be similar to the mechanical mounting structure 102 described above. Mechanical mounting structure 200 may be housed within and/or formed as part of a larger structure, such as a cabinet (like cabinet 100) and/or other structure. In other embodiments, the mechanical mounting structure 200 may be formed as a standalone structure. Mechanical mounting structure 200 may include a baseplate 202 (similar to baseplate 108), a first sidewall 204 (similar to first sidewall 110), and a second sidewall 206 (similar to second sidewall 112). The baseplate 202, the first sidewall 204, and/or the second sidewall 206 may be formed integrally from a single piece of material and/or may be formed separately and later joined. For example, each of the baseplate 202, the first sidewall 204, and/or the second sidewall 206 may each define one or more mating apertures (not shown) that are configured to receive pins, bolts, rivets, and/or other fasteners. Each of the baseplate 202, the first sidewall 204, and/or the second sidewall 206 may be precision machined, such as by using a CNC machine. Each feature (including the mating apertures) of the baseplate 202, the first sidewall 204, and/or the second sidewall 206 may be formed within 0.010 inches, more commonly within 0.005 inches of the dimensions set forth in the design specifications of the mechanical mounting structure 200. The baseplate 202 may define a mounting site 208 that may be used to secure a robotic arm 210 to the mechanical mounting structure 200. For example, the mounting site 208 may include a peripheral sidewall 212 that defines a recess having an open top that receives a portion of the robotic arm 210. The peripheral sidewall 212 and recess may have any cross-sectional shape, including generally circular shapes.

The robotic arm 210 may have any form or function, depending on the needs of a particular application. As just one example, the robotic 210 may have a base 214 that may include at least some of the power and/or control circuitry of the robotic arm 210. Some or all of the base 214 may be received within the recess of the mounting site 208. In some embodiments, the size and/or shape of the peripheral sidewall 212 may be designed to receive the base 214 of the robotic arm 210. The robotic arm 210 may include an arm 216 that may be used to maneuver an end of arm tooling 218 to desired positions within the mechanical mounting structure 200. The arm 216 may include one or more arm segments 220, with adjacent arm segments 220 being movably coupled with one another via one or more joints 222. In some embodiments, the arm 216 is configured to rotate with respect to the base 214. The joints 222 and/or connection of the arm 216 with the base 214 may be configured to enable precise adjustments (to within 1 mm or less) of the position of the end of arm tooling 218 in three-dimensions. The end of arm tooling 218 may include one or more tools that are usable to interact with various objects. For example, the end of arm tooling 218 may include a gripping element 224 as illustrated here, while other embodiments may incorporate various other tools, such as suction devices, cutting implements, and the like. The gripping element 224 may include a set of jaws 226 that are movable relative to one another to allow the gripping element 224 to be positioned about and grasp objects.

In some embodiments, each of the first sidewall 204 and the second sidewall 206 may have a generic structure, such as a generally flat profile that includes one or more mounting locations for various sub-systems. In other embodiments, one or both of the first sidewall 204 and the second sidewall 206 may have a unique structure that may be designed to secure a specific sub-system within the mechanical mounting structure 200. The unique structure may be custom designed to mount and/or receive various components of the specified sub-system. For example, as illustrated here, a medication dosing sub-system 228 is mounted to the first sidewall 204, although other types of sub-systems may be used in various embodiments. Medication dosing sub-system 228 may be configured to automatically transfer accurately metered doses of liquid medicaments from multi-dose containers (such as vials) to single dose containers, such as syringes and medication bags (such as IV bags). To facilitate alignment and positioning of the syringes, vials, and/or medication bags for various fluid transfer processes, the medication dosing sub-system 228 may include a rotating support 230 that is used to selectively rotate various components of the medication dosing sub-system 228. In some embodiments, actuators, such as rotational actuators 232, that are used to drive the rotation of the rotating support 230 may be positioned on a rear side of the first sidewall 204. To accommodate such a setup in which various components of a single sub-system are mounted on both an interior and exterior side of the first sidewall 204, the first sidewall 204 may define one or more apertures that enable coupling components to be inserted through the first sidewall 204. For example, rotational actuators 232 may include one or more drive mechanisms (such as drive shafts) that may extend from the rotational actuator 232 through an aperture defined by the first sidewall 204 and into the rotating support 230.

A syringe finishing sub-system 234 is mounted to the second sidewall 206, although other types of sub-systems may be used in various embodiments. Syringe finishing sub-system 234 may include a syringe holder 236 that holds a syringe while the syringe finishing sub-system 234 automatically removes a needle of a syringe, places a tamper-evident cap on the syringe, prints and/or applies a label to the syringe that describes the contents of the syringe, and/or performs other functions. After completion of these steps, the syringe may be transferred to an output bin.

It will be appreciated that medication dosing sub-system 228 and syringe finishing sub-system 234 are merely illustrated as one example of a combination of sub-systems that are usable with the mechanical mounting structure 200. Other non-limiting examples of sub-systems may include sub-systems of a larger medication dosing system, such as 1) a syringe preparation and inspection sub-system that verifies that a correct size of syringe is used with a specific medicament, as well as that removes a needle cover for subsequent filling of the syringe, 2) a vial management sub-system that determines that a correct vial is selected for a particular application, 3) a reconstitution/stock solution processing sub-system that reconstitutes a dry powder vial for diluent injection by injecting a calibrated amount of diluent into the vial and agitating the solution for controlled amounts of time, 4) a bag management sub-system that positions medication bags for weighing, optional liquid withdrawal, barcode scanning to confirm type, injection, re-weighing and labeling, and/or 5) a container loading and unloading sub-system that controls the handling of empty and full containers of medicament. Examples of such sub-systems are described in U.S. patent application Ser. No. 17/006,027, titled "Systems and Methods for Parallel Preparation Processing", the entire contents of which were previously incorporated by reference.

The robotic arm 210 may interact with various objects of sub-systems 228, 234. For example, the gripping element 224 affixed to the end of arm tooling 218 may be used to grasp and move vials, syringes, medication bags, and/or other objects to and from the medication dosing sub-system 228. Additionally, the robotic arm 210 may be configured to move syringes to the syringe finishing sub-system 234. For example, once a syringe is filled by the medication dosing sub-system 228, the robotic arm 210 may grasp and move the filled syringe from the medication dosing sub-system 228 to the syringe holder 236 of the syringe finishing sub-system 234, which may perform final preparation steps, such as printing and/or affixing a label to the syringe, removing a needle of the syringe, capping the syringe, and/or other processing steps. The robotic arm 210 may then transfer the completed syringe to an output tray (not shown).

To help the robotic arm 210 locate various points of interaction (such as locations for grabbing objects, releasing objects, loading objects, unloading objects, etc.) with the sub-systems 228, 234 a location teaching process may be performed. Not only does the location teaching process enable the robotic arm 210 to automatically determine a location of any points of interaction but also to make any adjustments to a stored position of one or more locations of points of interaction with respect to a 3-dimensional coordinate system. The 3-dimensional coordinate system may be established with a high degree of precision within the constraints of the mechanical mounting structure 200 due to the knowledge that the robotic arm 210 is mounted at a precisely known position of the baseplate 202 relative to the sidewalls 204, 206 and the sub-systems 228, 234 are mounted at precisely known locations of the sidewalls 204, 206 relative to the baseplate 202. This 3-dimensional coordinate system, along with knowledge of geometries of the various sub-systems 228, 234 enables the robotic arm 210 to self-locate points of interaction using the location teaching process.

Figure 3A:
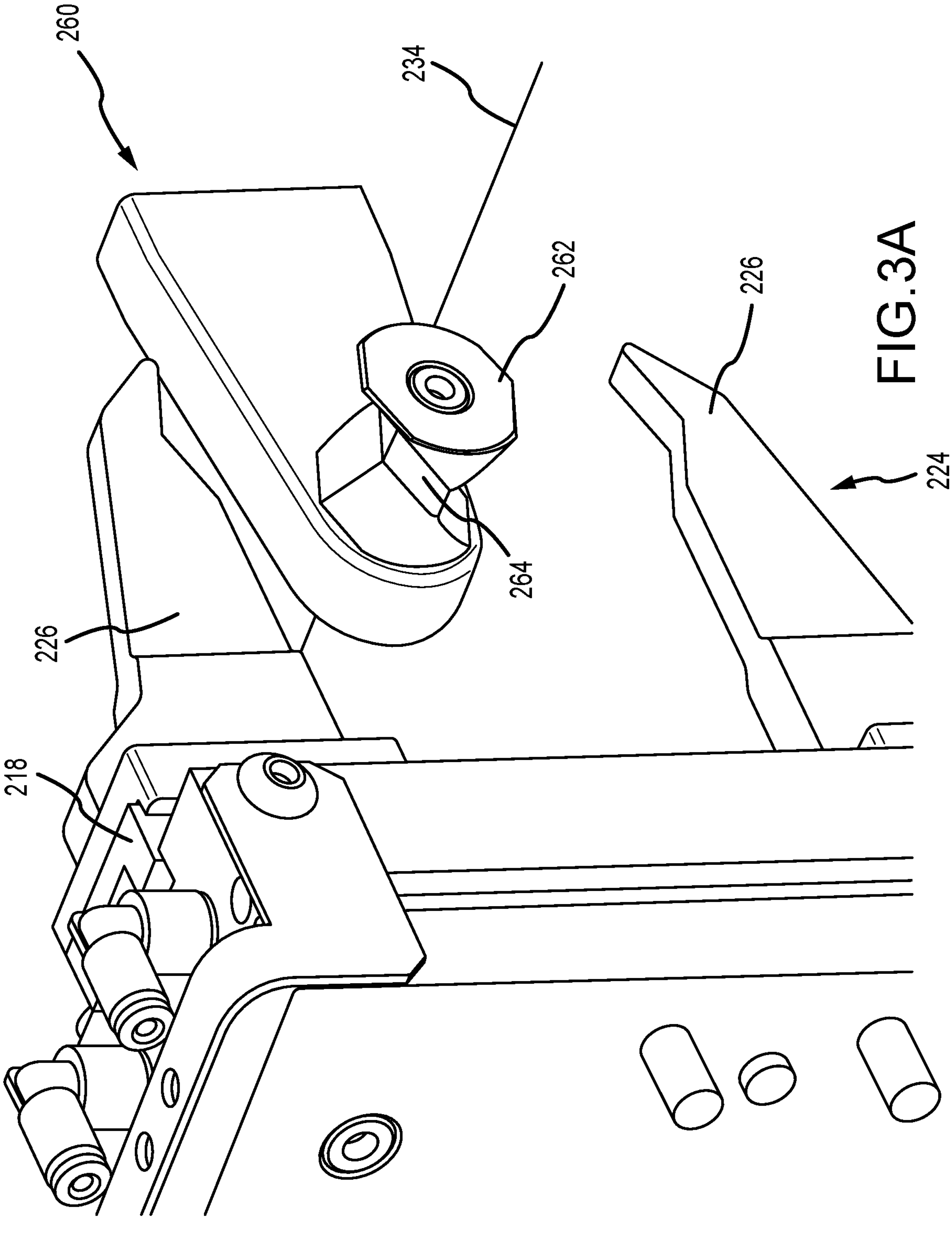
FIG. 3A illustrates a gripping element of a robotic arm in an open position about an interface object according to embodiments of the present invention.
Figure 3B:
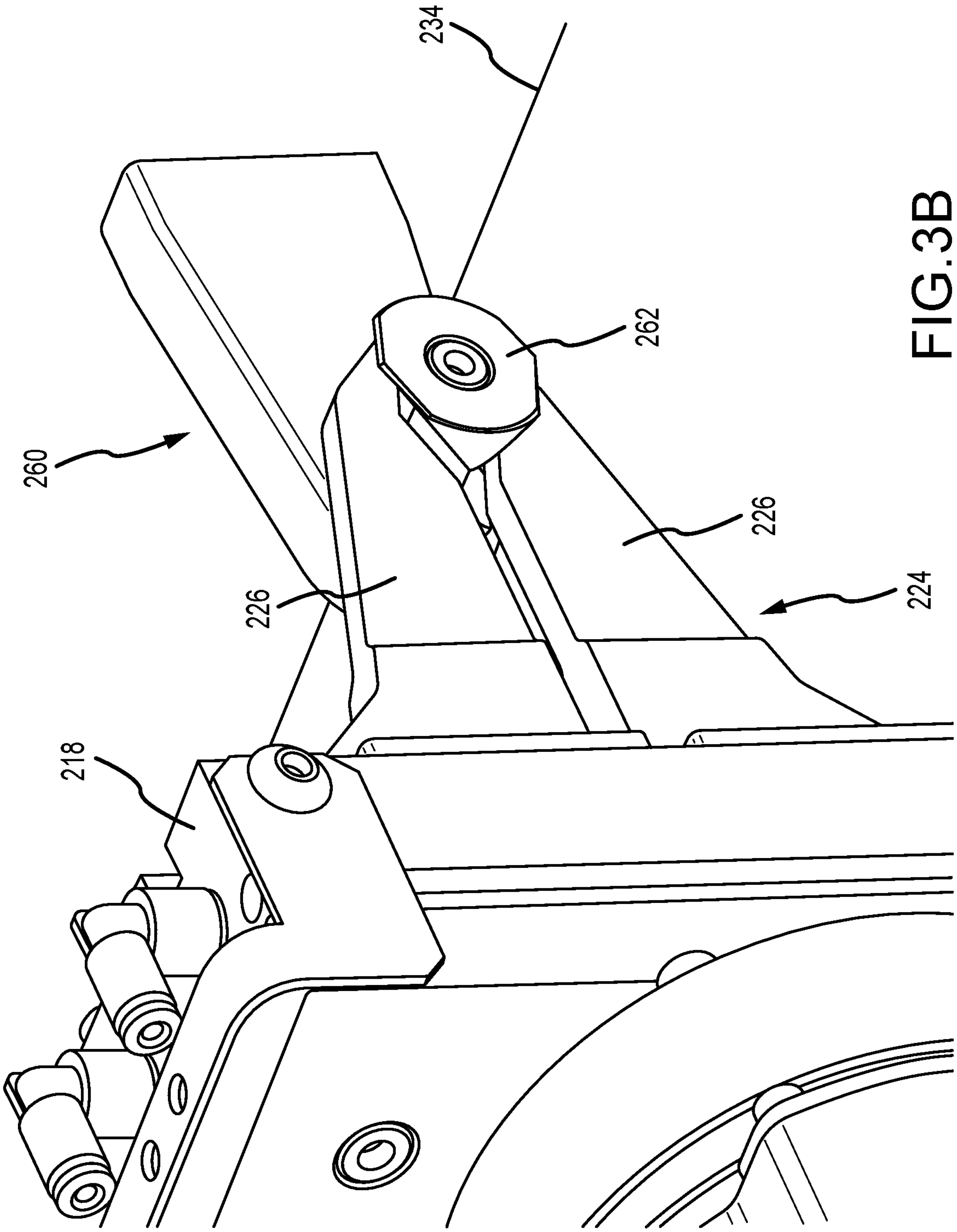
FIG. 3B illustrates the gripping element of FIG. 3A in a partially closed position.
Figure 3C:
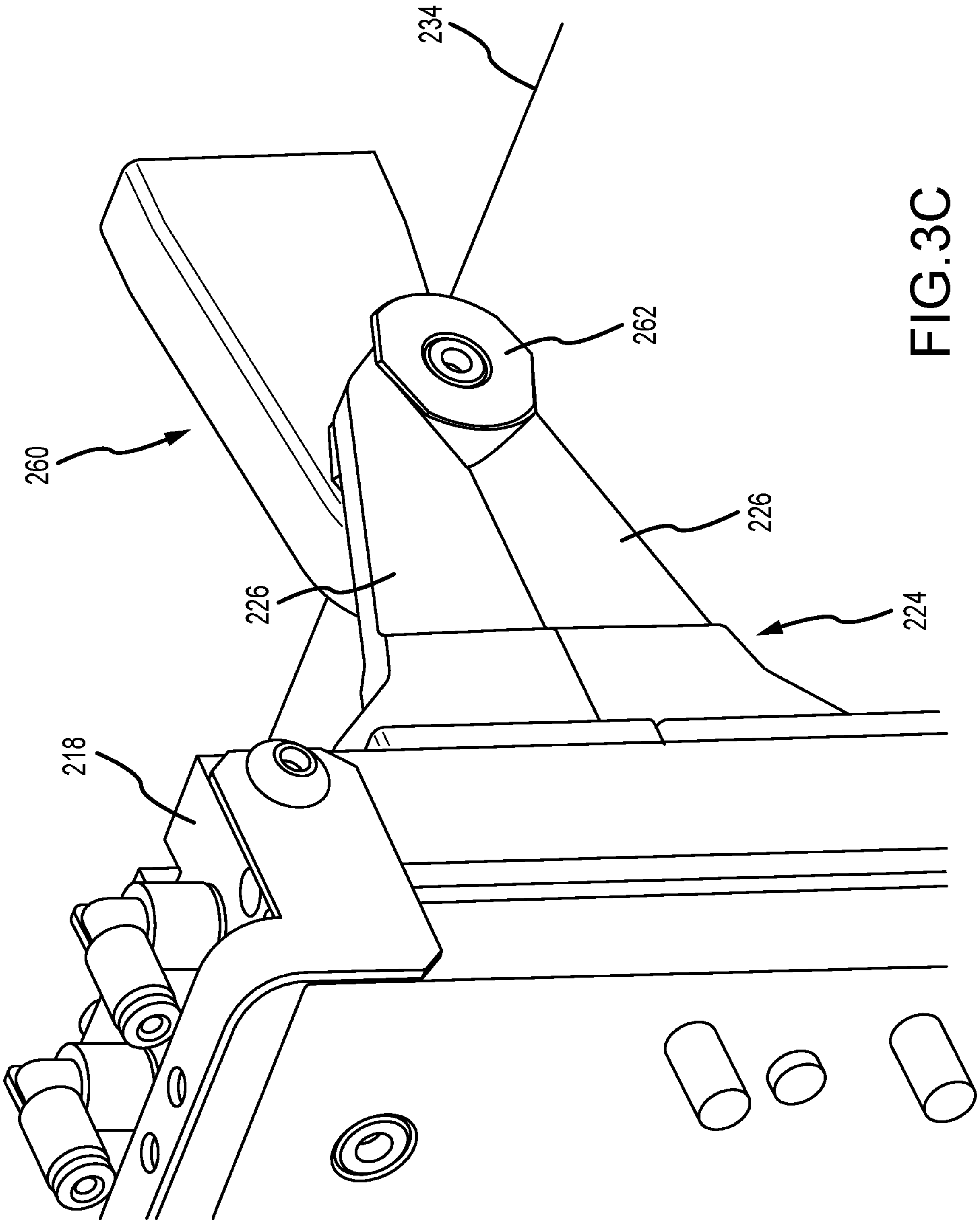
FIG. 3C illustrates the gripping element of FIG. 3A in a fully closed position.

An automated technique for teaching the robotic arm locations of various points of interaction is described with respect to FIGS. 3A-3C. For example, one or more interface objects 260 may be positioned at various locations of one or more of the sub-systems 228, 234 mounted on the mechanical mounting structure 200. The interface object 260 may be affixed to one or more of the sub-systems 228, 234 (such as by fastening, welding, adhering, and/or otherwise securing the interface object 260 at a location of the sub-system 228, 234). In some embodiments, the location may be predetermined, such that each interface object 260 is affixed at a known location on a particular sub-system 228, 234. A set of coordinates associated with the location within the 3-dimensional coordinate system may be determined based on the position of the interface object 260 relative to the respective sidewall 204, 206 and/or sub-system 228, 234. These coordinates of the interface object 260 may be programmed into a controller of the robotic arm 210.

The interface object 260 may take various forms that enable a sensor (not shown) of the robotic arm 210 to align itself with the interface object 260 and determine an actual position of the interface object within the three-dimensional coordinate system. For example, the interface object 260 may include at least one alignment feature 262 of a known size and shape. By having a known size and shape, the alignment feature 262 may enable the sensor to optically and/or physically verify an alignment and/or position of the interface device 260. As illustrated, the interface object 300 may have a 3-dimensional profile that provides a location for the gripping element 224 of the robotic arm 210 to grasp. For example, the interface object 260 may include a variable thickness/diameter and/or a variable cross-sectional shape that allows the sensor of the robotic arm 210 to determine whether the sensor and end of arm tooling are precisely aligned with the interface object 260. As just one example, the cross-sectional shape of the interface object 260 may include one or more generally conical profiles. In the presently illustrated embodiment, the interface object 260 includes two generally conical profiles that are inverted relative to one another. Here, a thinnest portion 264 (or other unique physical characteristic that may serve as a known calibration position) of the interface object 260 is at a precisely known location proximate a center of the interface object 260 and is representative of the position of the interface object 260. Due to the variable thickness and/or shape of the interface object 260, the gripping element 224 may only be able to fully close about the interface object 260 when the gripping element 224 is positioned about the known location of the thinnest portion 264, which is indicative of the actual coordinate position of the interface object 260. Any misalignment will result in the gripping element 224 being partially open due to contact with a portion of one of the conical profiles on either side of the thinnest portion 264.

It will be appreciated that the interface object 260 may take other forms. For example, an interface object may have a 3-dimensional profile shape that corresponds with and/or nests within a tool affixed to the end of arm tooling 218 such that any interference between the tool and the interface object indicates misalignment. In other embodiments, an alignment feature of the interface object may include a 2-dimensional and/or 3-dimensional computer-readable pattern or shape that enables an optical sensor (not shown) affixed to the end of arm tooling 218 to align the end of arm tooling 218 with the interface object 260. In some embodiments, the interface object 260 may be a decal or other 2-dimensional object that may be imaged by an optical sensor.

Due to the possible variability in dimensions of the sub-system 228, 234 (which may or may not be precision machined), the initially programmed location of the interface object 260 may not be a precise, actual position of the interface object 260 within the three-dimensional coordinate system. To determine the actual position, the sensor of the robotic arm 210 may be used to perfectly align the gripping element 224 and robotic arm 210 with the interface object 260. For example, gripping element 224 of the robotic arm 210 may be maneuvered to the programmed position of the interface object 260, which will likely get the gripping element 224 in close proximity/alignment with the interface object 260 as illustrated in FIG. 3A. The gripping element 224 may be closed about the interface object 260. If the programmed position is not the precise actual position of the interface object 260, the gripping element 224 may not fully close about the interface object 260 as illustrated in FIG. 3B. The sensor of the robotic arm 210 may be able to detect a gripping position, such as a degree of closure, of the gripping element 224. As such, when the gripping element 224 fails to fully close, the sensor may determine that the programmed position and the actual position are offset from one another. Based on this offset, the sensor may instruct the robotic arm 210 to increment and/or otherwise adjust a position of the gripping element 224 along one or more axes if necessary. This process may be repeated until the gripping element 224 is able to fully close about the interface object 260 as illustrated in FIG. 3C. When a full close position is detected by the sensor, the sensor may determine that the gripping element 224 is fully aligned with the interface object 260, which is indicative of the gripping element 224 being at the precise actual position of the interface object 260. The programmed position may then be updated to match the measured actual position within the three-dimensional coordinate system. Based on the actual location of the interface object 260 and the known position of the interface object 260 on the known geometry of the sub-system 228, 234, the controller of the robotic arm 210 may be calibrated to know the actual positions of each component of the sub-system 228, 234, oftentimes with a certainty of within 1 mm or less.

In an embodiment in which the sensor of the robotic arm 210 is an optical sensor, such as an optical imaging device (such as a camera) and/or laser device, the optical sensor may be configured to determine a relative position of the end of arm tooling 218 and optical sensor relative to the interface object 260. For example, to determine a vertical, horizontal, and/or angular position of the end of arm tooling 218, the optical sensor may determine whether the optical sensor is properly aligned with the alignment feature 262 and whether the known shape and/or size of the alignment feature 262 matches an expected result. For example, the known size and shape of the alignment feature 262 may be associated with a preprogrammed expected image of the optical sensor when the robotic arm is properly positioned at an actual position of the interface object 260. Any mismatch in the current image of the optical sensor and the expected image may be indicative of the programmed position of the interface object 260 being offset from the actual position of the interface object 260. A size mismatch between the images may indicate that a distance between the robotic arm 210 and the actual position of the interface object 260 is incorrect and that the actual position of the interface object 260 does not match the programmed position. Based on the image comparisons, the sensor may cause a controller of the robotic arm 210 to adjust a position of the robotic arm 210 until the expected image and current image match. The programmed position may then be updated to match the measured actual position within the three-dimensional coordinate system.

Figure 4:
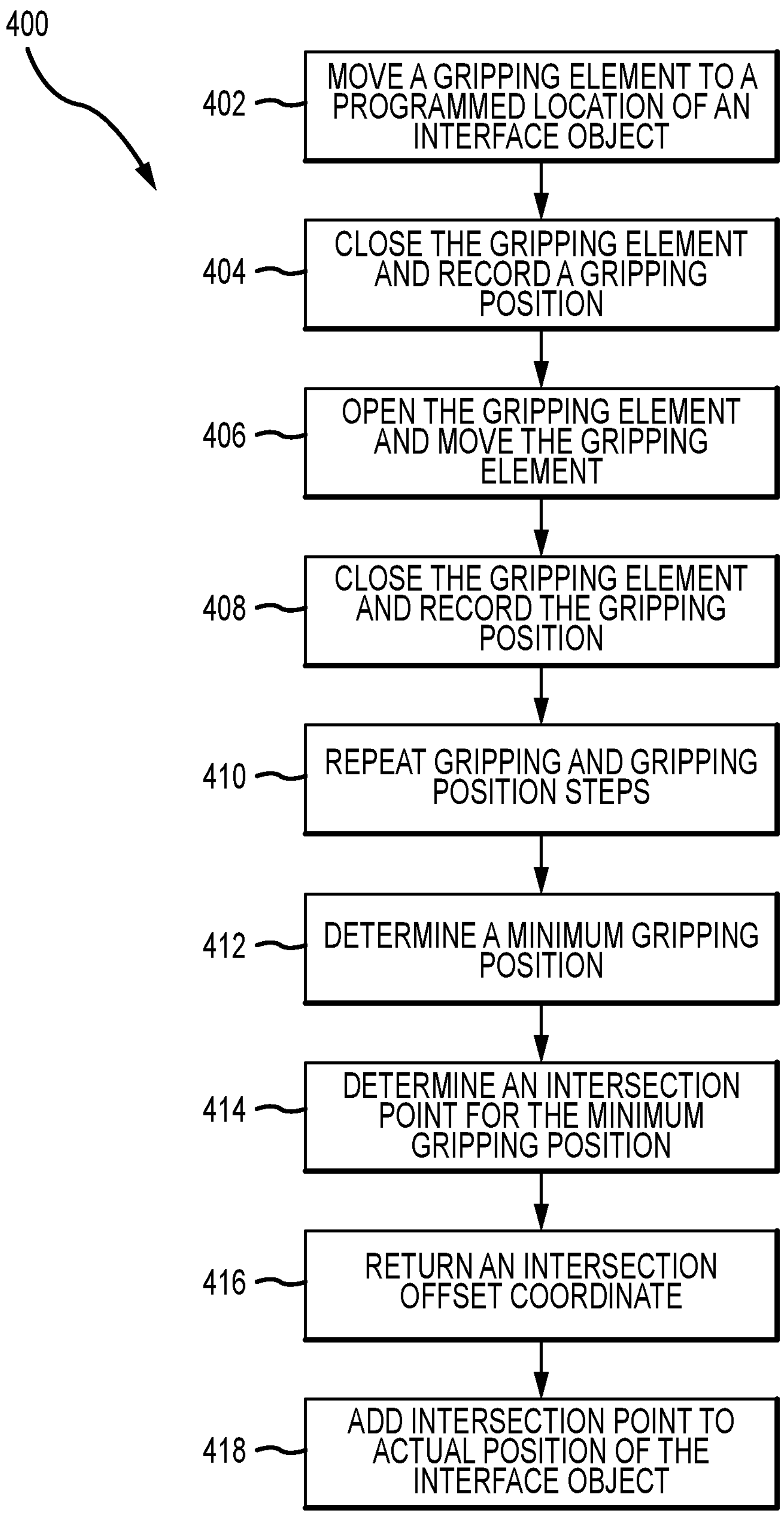
FIG. 4 is a flowchart of a process for location learning according to embodiments of the present invention.

In the illustrated embodiment, the robotic arm 210, end of arm tooling 218, and gripping element 224 may be configured to move about six axes of direction. For example, the robotic arm 210 may be moved in three linear directions (X, Y, Z) and three rotational directions (RX, RY, RZ). As illustrated in FIG. 4 one particular location learning process 400 may begin at block 402 by moving the gripping element 224 to the original programmed position of the interface object 260. The gripping element 224 may be closed and a gripping position of the gripping element 224 may be recorded at block 404. At block 406, the gripping element 224 may be opened and moved to a particular position along a single axis (such as the X axis). For example, the particular position may be position N=1 in a formula: {Programmed Position}+N*dev, where dev is a predetermined deviation (such as 0.001 inch, 0.005 inch. 0.01 inch, etc.). The gripping element 224 may be closed and the gripping position may be recorded at block 408. Blocks 406 and 408 may be repeated for a number of positions at block 410. For example, blocks 406 and 408 may be repeated for N=−P, −P+1, . . . , −1, 0, 1, . . . , P−1, P (where P is the detection limit of the sensor and/or robotic arm 210). Based on the gripper positions determined in blocks 408 and 410, a minimum gripper position (closest to fully closed) may be determined and returned at block 412. In some embodiments, data about the minimum gripper position may be split, with linear regression being performed on the split data. An intersection point between the two linear regressions may be determined at block 414. An intersection offset (such as an X offset) may be returned at block 416. The intersection offset may added to an actual position of the interface object at block 418. Blocks 404 through 418 may be repeated for each axis of movement of the robotic arm 210. Once the process has been performed for each axis, the actual position of the interface object 260 may be defined by the six coordinates of linear and rotational position within the 3-dimensional coordinate system.

Figure 5:
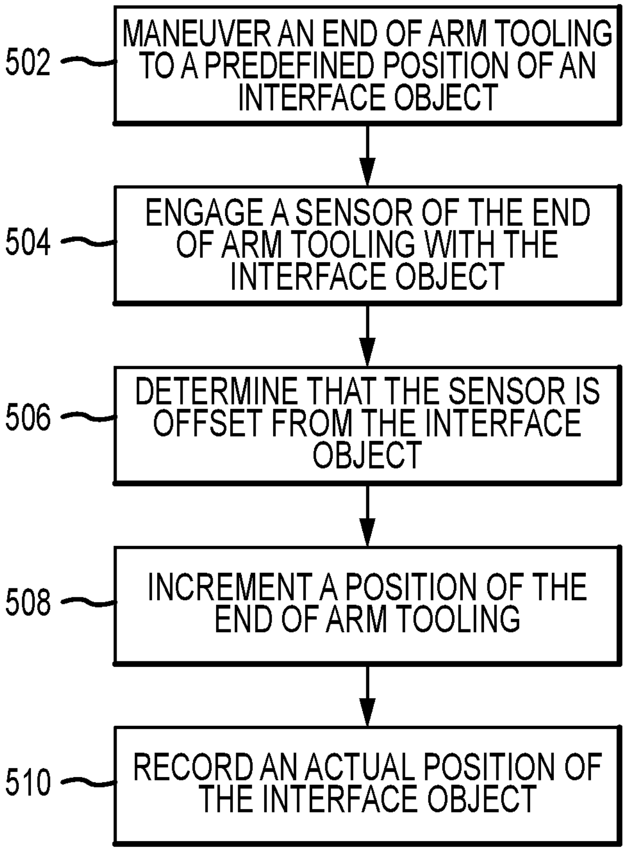
FIG. 5 is a flowchart of a process for performing location teaching of a robotic arm according to embodiments of the present invention.

FIG. 5 is a flowchart of a process 500 for performing location teaching of a robotic arm. Process 500 may include any of the steps involved in process 400. Process 500 may be performed by a robotic arm that is secured to a mechanical mounting structure, such as mechanical mounting structure 102 or 200. Process 500 may begin at block 502 by maneuvering an end of arm tooling of a robotic arm to a predefined position of an interface object. For example a gripping element or other tool of the robotic arm may be maneuvered to a programmed position of the interface object, where the programmed position is indicative of an estimated position of the interface object. The interface object may include at least one alignment feature of a known size and shape. At block 504, a sensor of the end of arm tooling may be engaged with the interface object. For example, the gripping element may be closed about the interface object, with a sensor detecting a gripping position of the gripping element. In some embodiments, the sensor may be an optical sensor that optically images the interface object when engaged with the interface object.

At block 506, it may be determined that the sensor of the end of arm tooling is offset from the interface object based at least in part on an interaction between the sensor and the at least one alignment feature. For example, for a sensor that detects a gripping position of the gripping element, the sensor may determine a degree of closure (such as a distance between jaws) of the gripping element at the predefined position. Based on the degree of closure, the sensor may determine whether the sensor and end of arm tooling are offset from an actual position of the interface object. For example, if a gripping position does not match an expected gripping position of a calibration point (such as when the gripping element closes about a thickness of the interface object that does not match a known thickness of the interface object at the calibration position of the interface object), the sensor may determine that an offset exists. In embodiments in which an optical sensor is used, the optical sensor may compare an image of the alignment feature of the interaction object to an expected size and shape of the alignment feature (which may be preprogrammed based on an image of the interaction object at a proper calibration position) to determine an offset, such as when the expected size and/or shape do not match the size and/or shape in the current image.

At block 508, a position of the end of arm tooling may be incremented with respect to the interface object along at least one axis. In some embodiments, each linear and/or rotational axis of movement of the robotic arm may be adjusted in a single step, while in other embodiments only a subset of the axes of movement may be adjusted in a single step. In some embodiments, the incremental value of the end of arm tooling may be a standard value, such as a minimum movement and/or detection value of the robotic arm and/or the sensor. In other embodiments, an amount and/or direction of the offset may be determined based on the sensor data. For example, the gripping position of the gripping element may be indicative of the gripping element being closed at a particular location of the interface object, which may enable the sensor and robotic arm to determine an exact and/or approximate offset. The distance and/or direction of the incremental movement may be determined based on this offset. Upon incrementing the position of the end of arm tooling, the detection of any additional offset may be determined. The offset detection and position adjustment steps may be repeated until no offset is detected. At this point, the sensor and/or robotic arm may determine that this location is the actual position of the interface object relative to the robotic arm and may record this position in terms of a 3-dimensional coordinate system at block 510. Based on the actual position of the interface object, the position of the interface object relative to the sub-system, and the known geometry of the sub-system, the robotic arm may determine a relative position of any point of interaction of the sub-system, oftentimes within less than 1 mm of precision.

In some embodiments, the process 500 may include affixing the interface object on the sub-system prior and programming the robotic arm with the predefined position of the interface object in terms of the 3-dimensional coordinate system prior to block 502. In some embodiments, process 500 may be performed with a satellite subsystem (which is not attached to the precisely machined mechanical mounting structure). For example, one or more interface objects may be affixed to the satellite sub-system, with positions of the interface objects being carefully measured and programmed into the robotic arm. The process 500 may then proceed in a similar manner as described above. As long as the programmed positions are sufficiently accurate such that the end of arm tooling and sensor of the robotic arm may engage the interface object when at the programmed position, the process 500 will be able to determine the actual position of the interface objects, and subsequently the satellite subsystem.

Figure 6:
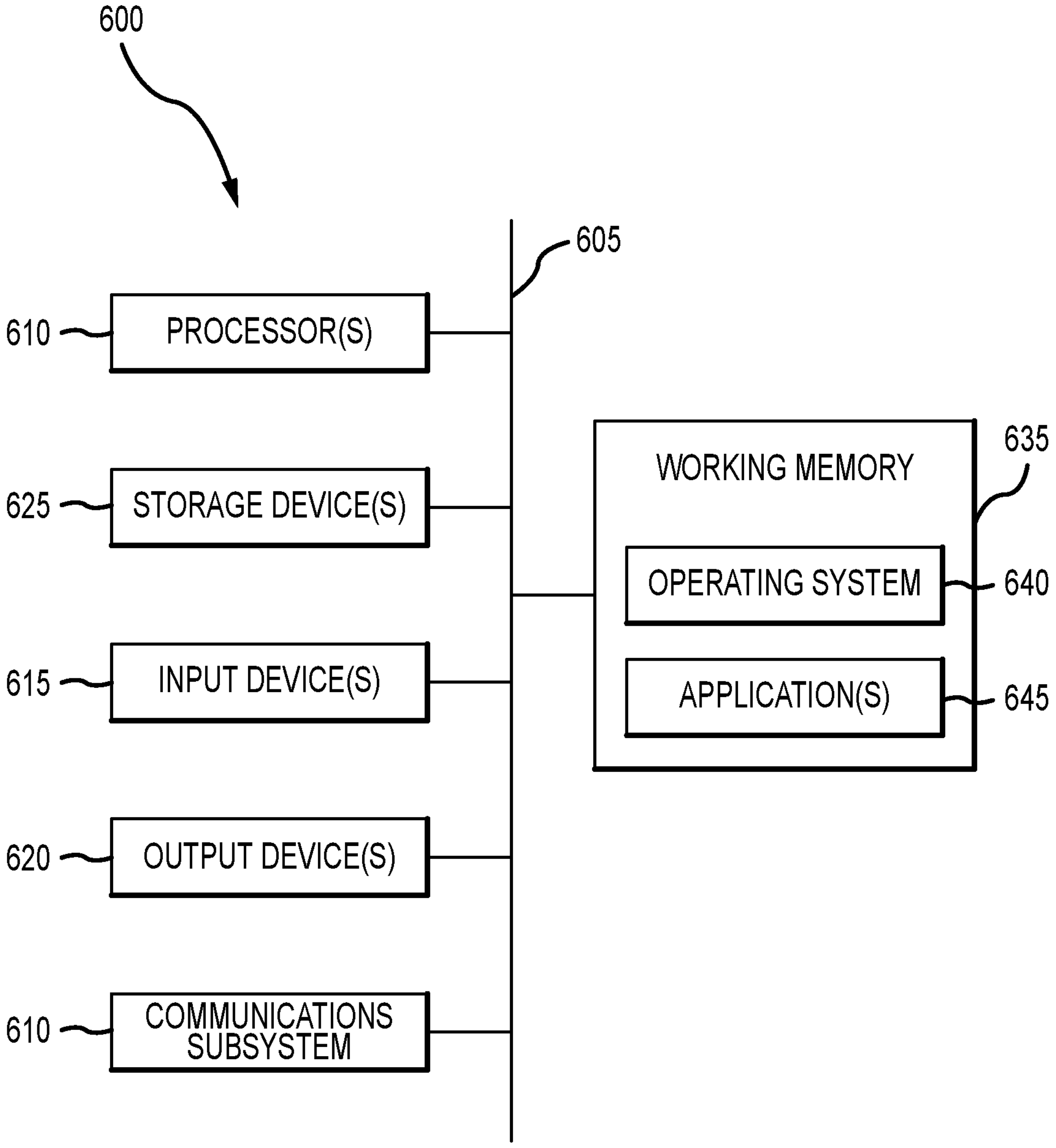
FIG. 6 is a block diagram of a computing system according to embodiments of the present invention.

A computer system as illustrated in FIG. 6 may be incorporated as part of the previously described computerized devices. For example, computer system 600 can represent some of the components of robotic arm 210, the various sub-systems, and/or other computing devices described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, an imaging device, and/or the like; and one or more output devices 620, which can include without limitation a display device, a speaker, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged.

A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of performing location teaching of a robotic arm, comprising:

maneuvering an end of arm tooling of a robotic arm to an expected position of an interface object, wherein:
- the robotic arm is mounted within a mounting site of a mechanical mounting structure;
- the interface object is positioned on a sub-system of a medication dosing system that is mounted on the mechanical mounting structure; and
- the interface object comprises at least one alignment feature of a known size and shape;

detecting the interface object using:
- an optical sensor disposed on the end of arm tooling; and
- physical alignment detection via a gripping element contacting the interface object, wherein the interface object is a variably-profiled interface object having a portion with a known calibration position;

determining that the optical sensor of the end of arm tooling is offset from the interface object based at least in part on a comparison between data from the optical sensor and the known size and shape of the alignment feature, wherein the comparison comprises:
- comparing a current image of the interface object with an expected image;
- detecting a size mismatch between the current image and the expected image; and determining that a distance between the end of arm tooling and the interface object does not match an expected result based on the size mismatch; and determining a vertical position, a horizontal position, and an angular position of the end of arm tooling based on the comparison.

2. The method of performing location teaching of a robotic arm of claim 1, further comprising:

incrementing a position of the end of arm tooling with respect to the interface object along at least one axis; and determining an actual position of the interface object relative to the robotic arm.

3. The method of performing location teaching of a robotic arm of claim 1, further comprising:

determining an actual position of the interface object by:

detecting alignment between the interface object and the optical sensor; and recording 3-dimensional coordinates associated with a current position of the interface object.

4. The method of performing location teaching of a robotic arm of claim 1, wherein:

the optical sensor comprises one or both of an imaging device and a laser.

5. The method of performing location teaching of a robotic arm of claim 1, further comprising:

determining a distance and axial direction of the offset based on the optical sensor.

6. The method of performing location teaching of a robotic arm of claim 1, further comprising:

determining an actual position of the interface object relative to the robotic arm; and calibrating a controller of the robotic arm to know actual positions of each component of the sub-system based on at least the actual location of the interface object, the expected position of the interface object, and a known geometry of the sub-system.

7. A medication dosing system, comprising:

a mechanical mounting structure comprising a baseplate and a sidewall that extends vertically relative to the baseplate;

at least one sub-system coupled with the sidewall;

an interface object affixed to the at least one sub-system, the interface object comprising at least one alignment feature of a known size and shape;

a robotic arm coupled with the baseplate, wherein the robotic arm comprises an end of arm tooling with an optical sensor;

a processor; and a memory having instructions stored thereon that, when executed by the processor, cause the medication dosing system to:

maneuver the end of arm tooling to an expected position of the interface object;

detect the interface object using:

the optical sensor of the end of arm tooling; and physical alignment detection via a gripping element contacting the interface object, wherein the interface object is a variably-profiled interface object having a portion with a known calibration position;

determine that the optical sensor of the end of arm tooling is offset from the interface object based at least in part on a comparison between data from the optical sensor and the known size and shape of the alignment feature, wherein the comparison comprises:

comparing a current image of the interface object with an expected image;

detecting a size mismatch between the current image and the expected image; and determining that a distance between the end of arm tooling and the interface object does not match an expected result based on the size mismatch; and determine a vertical position, a horizontal position, and an angular position of the end of arm tooling based on the comparison.

8. The medication dosing system of claim 7, wherein:

the interface object is positioned proximate an interaction point of the sub-system with which the robotic arm is configured to interact during operating of the medication dosing system.

9. The medication dosing system of claim 7, wherein:

the interface object comprises a variable cross-sectional shape.

10. The medication dosing system of claim 7, wherein:

comparing the current image of the interface object with an expected image comprises detecting an offset between the current image and the expected image.

11. A medication dosing system, comprising:

a mechanical mounting structure comprising a baseplate and a sidewall that extends vertically relative to the baseplate, wherein the mechanical mounting structure has known dimensions to within 0.010 inches of dimensions set forth in a design specification of the mechanical mounting structure;

at least one sub-system coupled with the sidewall;

an interface object affixed to the at least one sub-system, the interface object comprising at least one alignment feature of a known size and shape; and a robotic arm coupled with the baseplate, wherein:

the robotic arm comprises an end of arm tooling with an optical sensor that is configured to determine an actual location of the interface object;

the robotic arm is translatable in three dimensions to move the optical sensor relative to the interface object; and the robotic arm is configured to:

detect the interface object using:

the optical sensor of the end of arm tooling; and physical alignment detection via a gripping element contacting the interface object, wherein the interface object is a variably-profiled interface object having a portion with a known calibration position;

determine that the optical sensor of the end of arm tooling is offset from the interface object based at least in part on a comparison between data from the optical sensor and the known size and shape of the alignment feature, wherein the comparison comprises:

comparing a current image of the interface object with an expected image;

detecting a size mismatch between the current image and the expected image; and determining that a distance between the end of arm tooling and the interface object does not match an expected result based on the size mismatch; and determine a vertical position, a horizontal position, and an angular position of the end of arm tooling based on the comparison.

12. The medication dosing system of claim 11, wherein: the at least one alignment feature comprises a computer-readable pattern that enables the optical sensor to align the end of arm tooling with the interface object.

13. The medication dosing system of claim 12, wherein: the optical sensor is configured to determine a horizontal distance between the end of arm tooling and the interface object.

14. The medication dosing system of claim 11, wherein: the interface object comprises a generally conical profile.

15. The medication dosing system of claim 11, wherein: the interface object comprises a decal.

* * * * *